Figure 1:
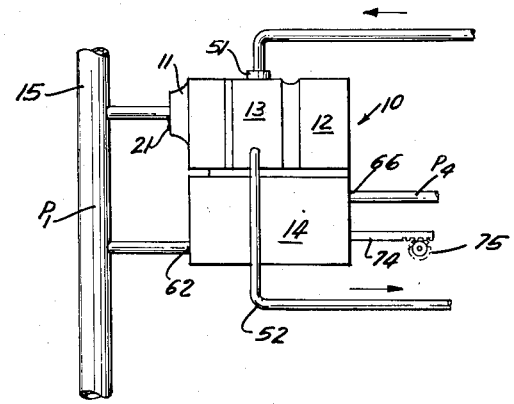

April 10, 1962  W. FRANTZ  3,028,748
LIQUID DENSITY COMPUTER
Filed Jan. 18, 1960

INVENTOR.
WILLIAM FRANTZ
BY Philip Mintz
ATTORNEY

United States Patent Office 3,028,748
Patented Apr. 10, 1962

3,028,748
LIQUID DENSITY COMPUTER
William Frantz, Winter Park, Fla., assignor to Curtiss-Wright Corporation, a corporation of Delaware
Filed Jan. 18, 1960, Ser. No. 2,954
5 Claims. (Cl. 73—32)

This invention relates to apparatus for computing continuously the density of a flowing liquid. More particularly this invention relates to apparatus for computing the density of a flowing liquid which apparatus is compact, light in weight, not affected by vibration or orientation and which is independent of variations in power sources.

It has long been known to obtain the density of a liquid by measuring the depth to which a floating hydrometer sinks. To obtain the density of a flowing stream by the use of a hydrometer, a portion of the stream is isolated so that the hydrometer may come to rest in a quiescent pool of liquid. Inaccurate readings or no readings at all are obtained if the liquid is in motion, vibration is present, the hydrometer and liquid samples are in abnormal gravitational fields, or the hydrometer touches the walls of the containing vessel. Additionally for the use of a hydrometer, the liquid must have a free surface in contact with a gas, and the containing vessel must remain upright. Obviously in view of these requirements, densities of liquids cannot be measured by use of hydrometers on moving vehicles, such as ships or airplanes.

It has also been known to measure the density of a liquid by comparing the weight of a fixed volume of a dense solid when submerged in the liquid with the weight of the same solid in air or in vacuo. The difference in weight divided by the volume of the solid is the density of the liquid being tested by this gravimetric procedure. For accurate measurement, an accurate balance or weighing scale is required. This gravimetric technique cannot be performed accurately in the presence of vibration, abnormal gravitational fields, or liquid in motion. Thus the gravimetric technique is likewise not suitable for use in vehicles in motion such as ships or airplanes.

It is accordingly an object of this invention to provide such a liquid density computer which will be light in weight, compact, rugged, and which may be used on moving vehicles.

It is a further object to provide such a liquid density computer which will give reliable readings regardless of the orientation of the computer, and regardless of vibration, the magnitude of the gravitational field, or other variables which might be introduced due to the motion of a moving vehicle on which the liquid density computer might be used.

It is a still further object to provide such a liquid density computer which will not require any carefully controlled input forces thereby eliminating any need for exact constant pressure or constant voltage power supplies.

With the above objects in view, the present invention mainly consists of a rotatable means, means for rotating the rotatable means, a first means for generating an output which is a function of the product of the density of the liquid being measured and the square of the speed of rotation of the rotatable means, a second means for generating an output which is a function of the square of the speed of rotation of the rotatable means, and a third means for generating an output which is a function of the ratio of the outputs of the first means and the second means.

In preferred embodiments, the rotatable means may be a shaft, and the means for rotating it may be a hydraulic motor or an electrical motor. The first means may be a centrifugal pump through which flows the liquid being measured. The second means may be a tachometric governor. The third means may be a ratio computer or pressure divider such as is disclosed and claimed in patent application No. 702,443 filed December 12, 1957 by William Frantz, now Patent No. 2,910,084.

Figure 2:
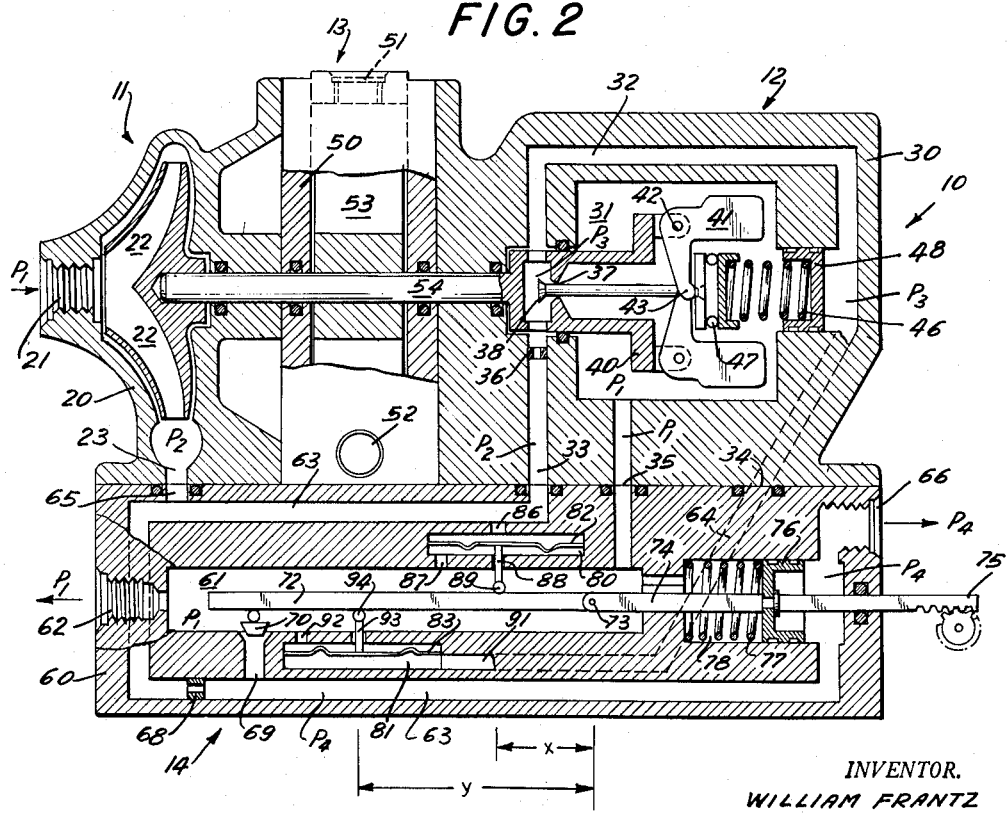

The novel features which are considered as characteristic for the invention are set forth in particular in the appended claims. The invention, itself, however, both as to its construction and its method of operation, together with additional objects and advantages thereof, will be best understood from the following description of a specific embodiment when read in connection with the accompanying drawings in which:

FIGURE 1 is a partially schematic view of the liquid density computer operatively connected to a pipe; and FIGURE 2 is a partially schematic vertical sectional view of the liquid density computer.

Referring to the drawings, and, more particularly to FIGURE 1, there is shown a pipe 15 through which may flow the liquid whose density is to be determined. The liquid density computer 10 is interconnected with pipe 15 at inlet 21 and at outlet 62.

Referring next to FIGURE 2 of the drawings, there is shown a vertical sectional view of a liquid density computer 10 constructed according to the principles of this invention. Briefly the liquid density computer 10 has four main subassemblies contained therein. These subassemblies are centrifugal pump 11, tachometric governor 12, motor 13 for driving centrifugal pump 11 and tachometric governor 12 from a common drive shaft, and pressure divider 14 for producing an output which is proportional to the ratio of the increase in pressures produced by centrifugal pump 11 and tachometric governor 12.

Centrifugal pump 11 comprises a housing 20 provided with a liquid inlet 21, rotatable impeller blades 22, and liquid outlet 23.

Tachometric governor 12 comprises a housing 30 having therein a hollow chamber 31 provided with liquid outlet 35, and liquid passageway 32 surrounding chamber 31. Liquid passageway 32 comprises an inlet 33 and an outlet 34. Between inlet 33 and outlet 34, there is provided a fixed constriction, such as an orifice plate 36, and an opening 37 interconnecting passageway 32 and chamber 31. Opening 37 is provided with a valve 38.

Within hollow chamber 31, there is provided a rotatable member 40 having pivotably mounted thereon governor weights 41 by means of pivots 42. Valve 38 in opening 37 is connected to ends 43 of governor weights 41 in such a manner that increasing the rate of rotation of rotatable member 40 which produces increasing outward radial forces on governor weights 41 produces longitudinal movement of valve 38 tending to further constrict opening 37.

Opposing the longitudinal movement of valve 38 under the influence of the radial motion of governor weights 41 is spring 46. Thus, decreasing the rate of rotation of rotatable member 40 produces decreasing outward radial forces on governor weights 41 allowing spring 46 to produce its longitudinal movement of valve 38 tending to further open opening 37.

Spring 46 is mounted on piston 48, which piston is also subjected to the output pressure of the tachometric governor. This mounting provides for a full range of pressure variation of output pressure with a minimum linear movement of valve 38. Because of this, the radial travel of governor weights 41 with variations in speed of rotation of rotatable member 40 is minimized.

Since spring 46 and piston 48 do not rotate and spring 46 must press against the rotating ends 43 of governor weights 41, there is provided a ball bearing 47 between them.

It may be seen that for any fixed rate of speed of rotation of rotatable member 40 there will be substantially no change in the angular displacement of governor weights 41 about pivot 42 because of the sensitive action of valve 38 in conjunction with restriction 36.

Motor 13 may be any suitable type of motor for driving centrifugal pump 11 and tachometric governor 12 from a common drive shaft. As illustrated specifically in FIGURE 2, motor 13 comprises a housing 50 having therein a fluid inlet 51, fluid drain outlet 52, and a plurality of impeller vanes 53 mounted on drive shaft 54. It will be noted that centrifugal pump impeller blades 22 and tachometric governor rotatable member 40 are both mounted on the same motor drive shaft 54. Alternatively, motor drive shaft 54 may be rotated by an electric motor or a gas turbine.

Ratio computer or pressure divider 14 comprises a housing 60 having therein a hollow chamber 61 provided with liquid outlet 62. Surrounding hollow chamber 61 is a liquid passageway 63. Also located within housing 60 is another liquid passageway 64.

Passageway 63 is provided with an outlet 66 and with an inlet 65 which is connected to centrifugal pump liquid outlet 23. A branch of liquid passageway 63 is connected to tachometric governor inlet 33. Between inlet 65 and outlet 66, there is provided a fixed constriction, such as orifice plate 68, and an opening 69 interconnecting passageway 63 and chamber 61. Opening 69 is provided with a valve 70.

Within chamber 61 there is provided a floating lever 72 pivotably connected by pivot 73 to reciprocable arm 74. Reciprocable arm 74 terminates at the right hand end thereof in a means 75 for converting its linear motion to a rotary motion. Other means for indicating the position of member 74 may also be used if desired. Reciprocable arm 74 is positioned by piston 76 in conjunction with spring 77 in hollow cylinder 78.

It will be noted that one side of piston 76 is acted upon by the pressure that the fluid exerts in passageway 63 between orifice plate 68 and valve 70, which pressure is also the output pressure existing at outlet 66. It will further be noted that the opposite side of piston 76 is acted upon by spring 77 and the pressure of the liquid in chamber 61.

Housing 60 is also provided with small hollow chambers 80 and 81, each of which is divided by means of flexible, pressure sensitive diaphragms 82 and 83, respectively.

Hollow chamber 80 is provided with a fluid opening 86 which allows the pressure at inlet 65 of liquid passageway 63 to act on one side of flexible diaphragm 82. Hollow chamber 80 is also provided with a second opening 87 which allows the pressure existing in hollow chamber 61 to act on the reverse side of flexible diaphragm 82 in opposition to the pressure transmitted through opening 86.

To flexible diaphragm 82 is attached rod 88 which presses against lever 72 through the use of roller bearing 89. Thus the amount of pressure exerted by rod 88 on lever arm 72 is proportional to the difference between the pressure existing at inlet 65 (or centrifugal pump outlet 23) and the pressure existing in hollow chamber 61.

Hollow chamber 81 is provided with a fluid opening 91 which allows the pressure at tachometric governor outlet 34 to act on one side of flexible diaphragm 83 through liquid passageway 64. Hollow chamber 81 is also provided with a second opening 92 which allows the pressure existing in hollow chamber 61 to act on the reverse side of flexible diaphragm 83.

To flexible diaphragm 83 is attached rod 93 which presses against lever 72 through the use of roller bearing 94. Thus the amount of pressure exerted by rod 93 on lever arm 72 is proportional to the difference between the pressure existing at tachometric governor outlet 34 and the pressure existing in hollow chamber 61.

Rod 88 presses against lever arm 72 at a distance $x$ from pivot 73. Rod 93 presses against lever arm 72 at distance $y$ from pivot 73.

The position of valve 70 in opening 69 is determined by the position of lever arm 72 which moves in response to the pressures exerted by rods 88 and 93.

*Principles of Operation*

For any particular use, the liquid density computer operates in the following manner to produce outputs at outlet 66 in the form of a pressure and at means 75 in the form of movement which is proportional to the density of the liquid entering inlet 21 and leaving outlet 62.

The liquid entering inlet 21 has a pressure $P_1$. The centrifugal pump increases the pressure of this liquid to a pressure $P_2$ which is manifested at the outlet 23 of centrifugal pump 11. It is a characteristic of centrifugal pumps that the increase in "head" produced at the outlet is proportional to the square of the speed of rotation of the impeller blades of the pump. For any single pump the factors of hydraulic efficiency, shape of impeller blades and housing, etc. all remain constant. The "head" of a liquid is equal to the pressure of the liquid divided by its density. From these statements, it is evident that the increase in pressure provided by a centrifugal pump is therefore proportional to the density of the liquid being pumped times the square of the speed of rotation of the impeller blades. Stated mathematically, $$P_2 - P_1 = K_1 \rho N^2 \qquad (1)$$

Wherein:
$P_2$=the output pressure of centrifugal pump 11;
$P_1$=the pressure of the fluid entering centrifugal pump 11;
$K_1$=a constant for the specific centrifugal pump which is a function of the design of the pump and includes such factors as hydraulic efficiency, shape of impeller blades, etc.;
$\rho$=the density of the fluid being pumped; and
$N$=the speed of rotation of impeller blades 22.

In the tachometric governor 12, the fluid whose density is being measured is admitted at pressure $P_2$ through inlet 33 and leaves at pressure $P_1$ through outlet 35 which is connected through unobstructed passageways to liquid outlet 62. The pressure is reduced from $P_2$ to $P_1$ by means of fixed constriction or orifice plate 36 and variable constriction or valve 38. A pressure $P_3$ (intermediate in value between the pressure $P_2$ and $P_1$) will exist between the fixed constriction 36 and the variable constriction or valve 38. The magnitude of pressure $P_3$ above $P_1$ will depend upon the amount of resistance to flow presented by valve 38 which is in turn determined by the position of valve 38 under the influence of rotating governor weights 41. For a tachometric governor, this value of the difference between $P_3$ and $P_1$ is a function of the square of the speed of rotation.

Stated mathematically this may be expressed as:

$$P_3 - P_1 = K_2 N^2 \qquad (2)$$

Wherein:
$P_3$=the output pressure of the tachometric governor;
$P_1$=the back pressure acting on the tachometric governor;
$K_2$=a constant of proportionality which is a function of the design of the tachometric governor; and
$N$=speed of rotation of the governor weights.

If the centrifugal pump 11 and the tachometric governor 12 are both driven at the same instantaneous speed of rotation, a division of Equation 1 by Equation 2 can be used to provide a measurement of the density of the fluid. Dividing Equation 1 by Equation 2, there is obtained the following:

$$\frac{P_2-P_1=K_1\rho N^2}{P_3-P_1=K_2 N^2} \quad (3)$$

The constants $K_1$ and $K_2$ and the term $N^2$ cancel out leaving $$\rho = \frac{P_2-P_1}{P_3-P_1} \quad (4)$$

This division is performed by ratio computer or pressure divider 14 which is a device for performing such a division and presenting the results of the division as a pressure output $P_4$ and/or a mechanical movement of means 75.

It will be noted that diaphragm 82 is subjected to a pressure $P_2$ from one side and a pressure $P_1$ from the other side. Therefore rod 88 presses against lever 72 with a force proportional to $P_2$ minus $P_1$ or referring to Equation 1 $K_1\rho N^2$. It will be noted that diaphragm 83 is subjected to a pressure $P_3$ from one side and a pressure $P_1$ from the other side. Therefore rod 93 presses against lever 72 with a force equal to $P_3$ minus $P_1$ or referring to Equation 2 $K_2 N^2$.

As previously explained, rod 88 exerts its force against lever 72 at a distance $x$ from pivot 73 and rod 93 exerts its force at a distance $y$ from pivot 73.

For lever 72 to balance at an equilibrium position, the force of rod 88 times its distance from the pivot 73 must equal the force exerted by rod 93 times its distance from the pivot 73. Stated mathematically this is:

$$(P_2-P_1)A_1 x = (P_3-P_1)A_2 y \quad (5)$$

which reduces to $$K_1 \rho N^2 A_1 x = K_2 N^2 A_2 Y \quad (6)$$

Again the constants $K_1$ and $K_2$ and the term $N^2$ cancel out of the equation. Since the terms $A_1$ and $A_2$ can be made equal or of any desired value they too also cancel out leaving $$\rho x = y$$

or $$\rho = y/x \quad (7)$$

Where:

$P_1$, $P_2$, and $P_3$ are as defined above;
$A_1$ = the cross sectional area of diaphragm 82 exposed to the action of $P_2$ and $P_1$;
$A_2$ = the cross sectional area of diaphragm 83 exposed to the action of $P_3$ and $P_1$; and
$x$ and $y$ = the distances from the points where the forces are exerted on lever 72 to pivot 73.

Should there be a change in $P_1$, $P_2$, or $P_3$ for any reason whatever, lever 72 will no longer be balanced and will tend to move clockwise or counterclockwise about pivot 73. Such movement will tend to open or close valve 70.

Pressure divider 14, and more particularly liquid passageway 63 receives the liquid whose density is being measured at a pressure $P_2$ from the centrifugal pump 11 and, after allowing it to flow through fixed constriction or orifice plate 68 and variable constriction or valve 70, discharges the fluid at a pressure $P_1$ from liquid outlet 62. A pressure $P_4$ (intermediate value between the pressure $P_2$ and $P_1$) will exist between the fixed constriction 68 and the variable constriction or valve 70. The magnitude of pressure $P_4$ will depend upon the amount of resistance to flow presented by valve 70 under the influence of the position of lever 72.

Since pressure $P_4$ acts on one side of piston 76, any change in pressure $P_4$ will cause linear motion of piston 76 and therefore move indicating means 75. This motion of piston 76 responsive to change in pressure $P_4$ will also move pivot 73 toward or away from the points at which rods 88 and 93 act upon lever 72. This will thus change the magnitude of $x$ and $y$ until such time as a new equilibrium is achieved.

Since as explained above, the value of $$\frac{y}{x}$$

is a function of the density of the liquid and of the position of pivot 73 under the influence of pressure $P_4$, it is therefore obvious that the value of the density of the fluid being measured is likewise a function of the pressure $P_4$ as well as a function of the position of indicating means 75.

It is thus seen from Equation 7 wherein the value $N^2$ may be cancelled out that this liquid density computer is independent of the speed of rotation of the centrifugal pump blades 22 and the tachometric governor weights 41 provided they are all rotating at the same instantaneous rate of speed. Since motor drive shaft 54 drives both the centrifugal pump 11 and the tachometric governor 12, it is apparent that the conditions necessary for a cancellation of the rate of rotation N exists in this apparatus. As a consequence it is not necessary to control the rate of rotation of the drive shaft 54 at all for accurate readings of liquid density.

For most uses, the rate of flow of liquid through this liquid density computer will be relatively low. For most convenient installation, this liquid density computer will normally be connected as a bypass on the main line through which the liquid to be tested is flowing. Thus inlet 21 will be connected to a T in the main liquid flow line, and outlet 62 will be connected to another T in the same line as illustrated in FIGURE 1.

Accordingly it is thus seen that here is provided a liquid density computer which is compact, light in weight, rugged, not affected by vibration or orientation, and which is independent of variations in power sources.

For some applications it may be convenient to replace the centrifugal impeller with a fixed displacement pump operating against a fixed restriction. When this is done the fluid should be relatively free of dirt and contamination, and a separate source of fluid under pressure will be needed.

While the invention has been illustrated and described as embodied in a certain particular apparatus, it is not intended to be limited to the details shown, since various modifications and changes may be made without departing in any way from the spirit of the present invention as defined in the claims.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should be and are intended to be comprehended within the meaning and range of equivalents of the following claims.

What is claimed as new and desired to be secured by Letters Patent is:

1. A computer for continuously determining the density of a stream of liquid under a pressure $P_1$ which comprises: a first rotatable means; drive means for rotating said first rotatable means in said liquid for producing a stream of liquid under a pressure $P_2$ which is a function of the product of the density of the liquid being measured and the square of the speed of the rotation of said first rotatable means; a second rotatable means driven by said drive means and responsive to said liquid under pressure $P_2$ for producing a stream of liquid under a pressure $P_3$ and a stream of liquid under pressure $P_1$, the difference in pressure between $P_3$ and $P_1$ being a function of the square of the speed of rotation of said second rotatable means; and means responsive to the pressure differential between said streams of liquid under pressures $P_2$ and $P_1$ and said streams of liquid under pressures $P_3$ and $P_1$ for indicating the density of said liquid.

2. A computer for determining the density of a stream of liquid under a pressure $P_1$, comprising, in combination; centrifugal pump means for receiving a portion of said liquid under pressure $P_1$; means for driving said centrifugal pump to generate a pressure output $P_2$ which is a function of the product of the density of the liquid being measured and the square of the speed of the rotation of said centrifugal pump means; means rotated by said drive means and responsive to said output pressure $P_2$ for producing pressure outputs $P_3$ and $P_1$, the pressure differential between $P_3$ and $P_1$ being a function of the square of the speed of rotation of said drive means; and means responsive to the pressure differential between pressures $P_2$ and $P_1$ and the pressure differential between pressures $P_3$ and $P_1$ for producing an output pressure $P_4$ which is a function of the density of said liquid.

3. Apparatus for continuously computing the density of a stream of liquid under pressure $P_1$, comprising, in combination; a centrifugal pump having an inlet and an outlet for receiving and discharging said liquid; means for driving said centrifugal pump for discharging said liquid from said centrifugal pump under a pressure $P_2$ which is a function of the product of the density of the liquid being measured and the square of the speed of rotation of said centrifugal pump; a restrictive passageway for receiving said liquid under pressure $P_2$ and for varying the pressure thereof; a chamber having an inlet and an outlet adjacent said passageway; an adjustable valve extending in said passageway and said inlet of said chamber, a tachometric governor driven by said drive means for adjusting said valve means wherein a stream of liquid under pressure $P_3$ flows around said valve means and a stream of liquid flows through said valve means and from said outlet of said chamber under a pressure $P_1$, whereby the pressure differential between pressures $P_3$ and $P_1$ is a function of the square of the speed of rotation of said drive means; and means responsive to the pressure differentials $P_3-P_1$ and $P_2-P_1$ for generating a stream of liquid under pressure $P_4$ which is a function of the ratio of the outputs of said centrifugal pump and said tachometric governor and said adjustable valve, thereby generating an output pressure $P_4$ which is a function of the density of the liquid being measured.

4. Apparatus for continuously computing the density of a stream of liquid under a pressure $P_1$ which comprises: a centrifugal pump having an inlet and an outlet for receiving and discharging said liquid; drive means for rotating said centrifugal pump and for discharging from said centrifugal pump a stream of liquid under pressure $P_2$, the pressure $P_2$ being a function of the product of the density of the liquid and the square of the speed of rotation of said drive means; pressure divider means for receiving said stream of liquid under pressure $P_2$, said pressure divider means dividing said stream of liquid under pressure $P_2$ into a stream of liquid under pressure $P_3$ and a stream of liquid under pressure $P_1$, the pressure differential between said pressures $P_3$ and $P_1$ being a function of the square of the speed of rotation of said drive means; a chamber having an inlet and an outlet; a moment arm slidably supported in said chamber, said moment arm being arranged to pivot about a fulcrum point in said chamber; a cylinder, a piston mounted in said cylinder and connected to said moment arm for moving said moment arm in said chamber; a restricted passageway connected to said inlet in said chamber and to said cylinder from said outlet of said centrifugal pump for conveying a portion of said liquid discharged from said centrifugal pump into said chamber and into said cylinder; valve means secured to said moment arm and extending into said inlet in said chamber for regulating the pressure of said liquid entering said chamber from said restricted passageway and said cylinder; means for transforming said pressure differentials $P_3-P_1$ and $P_2-P_1$ into forces and applying said forces as a force couple to said moment arm, the difference between said forces of said force couple being equal to the density of said liquid, said unbalance force acting on said moment arm to adjust said valve with respect to said inlet in said chamber so as to maintain said liquid in said restricted passageway flowing into said cylinder at a pressure $P_4$ which is equal to the density of said liquid, said stream of liquid under pressure $P_4$ operating on said piston connected to said moment arm to adjust the position of said fulcrum point along said movement arm with respect to the force couple applied to balance said moment arm; and indicator means actuated by said piston for indicating the position of said fulcrum point with said force couple and thereby indicating the density of said liquid.

5. Apparatus as defined in claim 4 wherein said pressure divider means comprises a restricted passageway for receiving said liquid under pressure $P_2$, a chamber having an outlet adjacent said restricted passageway; adjustable valve means extending between said restricted passageway and said chamber; a tachometric governor driven by said drive means and connected to said adjustable valve means for adjusting the position of said valve whereby a stream of liquid under a pressure $P_3$ flows around said adjustable valve means and a stream of liquid under pressure $P_1$ flows from said outlet of said chamber adjacent said restricted passageway under a pressure $P_1$, the pressure differential between $P_3$ and $P_1$ being a function of the speed of rotation of said tachometric governor.

References Cited in the file of this patent

UNITED STATES PATENTS

| | | |
|---|---|---|
| 2,400,413 | Hersey | May 14, 1946 |
| 2,715,831 | Catford et al. | Aug. 23, 1955 |
| 2,936,608 | Mott | May 17, 1960 |